(12) United States Patent
Liu et al.

(10) Patent No.: US 10,802,786 B2
(45) Date of Patent: Oct. 13, 2020

(54) CONTENT SHARING METHODS AND APPARATUSES

(71) Applicant: Beijing Zhigu Rui Tuo Tech Co., Ltd, Beijing (CN)

(72) Inventors: Jia Liu, Beijing (CN); Wei Shi, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 201 days.

(21) Appl. No.: 15/326,443

(22) PCT Filed: Jun. 5, 2015

(86) PCT No.: PCT/CN2015/080852
§ 371 (c)(1),
(2) Date: Jan. 13, 2017

(87) PCT Pub. No.: WO2016/008343
PCT Pub. Date: Jan. 21, 2016

(65) Prior Publication Data
US 2017/0206048 A1     Jul. 20, 2017

(30) Foreign Application Priority Data

Jul. 18, 2014 (CN) .................. 2014 1 03450698

(51) Int. Cl.
*G06F 3/147* (2006.01)
*H04N 21/431* (2011.01)
(Continued)

(52) U.S. Cl.
CPC ............ *G06F 3/147* (2013.01); *G06F 3/1423* (2013.01); *H04N 21/4122* (2013.01); *H04N 21/4316* (2013.01)

(58) Field of Classification Search
CPC ... G06F 3/147; G06F 3/1423; H04N 21/4122; H04N 21/4316
See application file for complete search history.

(56) References Cited

U.S. PATENT DOCUMENTS 6,614,457 B1 * 9/2003 Sanada ................. G06F 3/0489
                                                      348/E5.105
6,819,711 B1    11/2004 Forde
(Continued)

FOREIGN PATENT DOCUMENTS

CN     1302496 A    7/2001
CN     1541457 A    10/2004
(Continued)

OTHER PUBLICATIONS

Chinese Office Action dated Jan. 10, 2018 for Chinese Application No. 201410345069.8, 12 pages (including translation).
(Continued)

*Primary Examiner* — Mark Edwards
(74) *Attorney, Agent, or Firm* — Amin, Turocy & Watson, LLP

(57) ABSTRACT

Content sharing methods and apparatuses are provided that relate to the field of communications. A method comprises: determining a projection region of a second display region of a second display device on a first display region of a first display device; acquiring related information of the second display region; and displaying corresponding content in the projection region according to the related information of the second display region. The methods and apparatuses can simplify content sharing steps, improve content sharing efficiency and/or enhance user experience.

29 Claims, 10 Drawing Sheets

(51) Int. Cl.
*H04N 21/41* (2011.01)
*G06F 3/14* (2006.01)

(56) References Cited

U.S. PATENT DOCUMENTS

| | | | |
|---|---|---|---|
| 7,120,134 B2 | 10/2006 | Tiedemann, Jr. et al. | |
| 7,596,194 B2 | 9/2009 | Janky | |
| 8,773,591 B1* | 7/2014 | Fan | H04N 5/4403 348/563 |
| 9,086,837 B1* | 7/2015 | Kang | G06F 3/016 |
| 9,113,404 B2 | 8/2015 | Nishioka | |
| 2007/0273609 A1* | 11/2007 | Yamaguchi | G06F 3/1423 345/1.1 |
| 2007/0273761 A1* | 11/2007 | Maruyama | G02B 27/0172 348/51 |
| 2012/0060109 A1 | 3/2012 | Han et al. | |
| 2013/0050258 A1* | 2/2013 | Liu | G02B 27/017 345/633 |
| 2013/0091527 A1 | 4/2013 | Ho et al. | |
| 2014/0115534 A1 | 4/2014 | Yuan | |
| 2014/0282646 A1* | 9/2014 | McCoy | G06K 9/00597 725/12 |
| 2014/0320912 A1* | 10/2014 | Kubo | G06F 3/1423 358/1.15 |
| 2015/0029217 A1* | 1/2015 | Ur | G06F 3/1423 345/629 |
| 2016/0055676 A1* | 2/2016 | Kasahara | G06T 19/006 345/633 |

FOREIGN PATENT DOCUMENTS

| | | |
|---|---|---|
| CN | 101317487 A | 12/2008 |
| CN | 101547477 A | 9/2009 |
| CN | 102301331 A | 12/2011 |
| CN | 103365572 A | 10/2013 |
| CN | 103458493 A | 12/2013 |
| CN | 103809751 A | 5/2014 |
| CN | 103927005 A | 7/2014 |
| CN | 104077149 A | 10/2014 |
| CN | 104093061 A | 10/2014 |
| CN | 104102349 A | 10/2014 |
| CN | 104123003 A | 10/2014 |
| WO | 2010090311 A1 | 8/2010 |
| WO | 2012143936 A1 | 10/2012 |
| WO | 2016008340 A1 | 1/2016 |
| WO | 2016008341 A1 | 1/2016 |
| WO | 2016008342 A1 | 1/2016 |

OTHER PUBLICATIONS

International Search Report for PCT Application No. PCT/CN2015/080852, dated Sep. 9, 2015, 3 pages.

* cited by examiner

CONTENT SHARING METHODS AND APPARATUSES

RELATED APPLICATION

The present application is a U.S. National Stage filing under 35 U.S.C. § 371 of international patent cooperation treaty (PCT) application No. PCT/CN2015/080852, filed Jun. 5, 2015, and entitled "CONTENT SHARING METHODS AND APPARATUSES", which claims the benefit of priority to Chinese Patent Application No. 201410345069.8, filed on Jul. 18, 2014, which applications are hereby incorporated into the present application by reference herein in their respective entireties.

TECHNICAL FIELD

The present application relates to the field of communications, and in particular, to content sharing methods and apparatuses.

BACKGROUND

With development of technologies, new display devices such as near-to-eye display devices (for example, smart glasses) and transparent screens constantly emerge, and users have more abundant and more convenient content display ways. Display interaction and content sharing between different display devices will provide greater convenience for users.

Generally, sharing display content from a display device A to a display device B and displaying corresponding content in a particular region of the device B comprises the following steps: 1) establishing a communication connection between the device A and the device B; 2) sending, by the device A, the display content to the device B; 3) receiving, by the device B, the display content; and 4) displaying, by the user, corresponding content in a particular region through a corresponding operation (for example, image stitching) on the device B. The process has tedious steps, takes more time and has poor user experience.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

An example, non-limiting objective of the present application is to provide a content sharing method and apparatus.

According to one aspect of at least one example embodiment of the present application, a content sharing method is provided, the method comprising:
  determining a projection region of a second display region of a second display device on a first display region of a first display device;
  acquiring related information of the second display region; and
  displaying corresponding content in the projection region according to the related information of the second display region.

According to another aspect of the at least one example embodiment of the present application, a content sharing method is provided, the method comprising:
  determining position information of a projection region of a second display region of a second display device on a first display region of a first display device; and
  sending the position information and related information of the second display region to the first display device.

According to another aspect of the at least one example embodiment of the present application, a content sharing apparatus is provided, the apparatus comprising:
  a determination module, configured to determine a projection region of a second display region of a second display device on a first display region of a first display device;
  an acquisition module, configured to acquire related information of the second display region; and
  a display module, configured to display corresponding content in the projection region according to the related information of the second display region.

According to another aspect of the at least one example embodiment of the present application, a content sharing apparatus is provided, the apparatus comprising:
  a determination module, configured to determine position information of a projection region of a second display region of a second display device on a first display region of a first display device; and
  a sending module, configured to send the position information and related information of the second display region to the first display device.

The content sharing methods and apparatuses according to the example embodiments of the present application can simplify content sharing steps, improve content sharing efficiency and/or enhance user experience.

DETAILED DESCRIPTION

Example embodiments of the present application are described in detail hereinafter with reference to the accompanying drawings and embodiments. The following embodiments are intended to describe the present application, but not to limit the scope of the present application.

It should be understood by those skilled in the art that, in the embodiments of the present application, the value of the serial number of each step described above does not mean an execution sequence, and the execution sequence of each step should be determined according to the function and internal logic thereof, and should not be any limitation of the embodiments of the present application.

Figure 1:
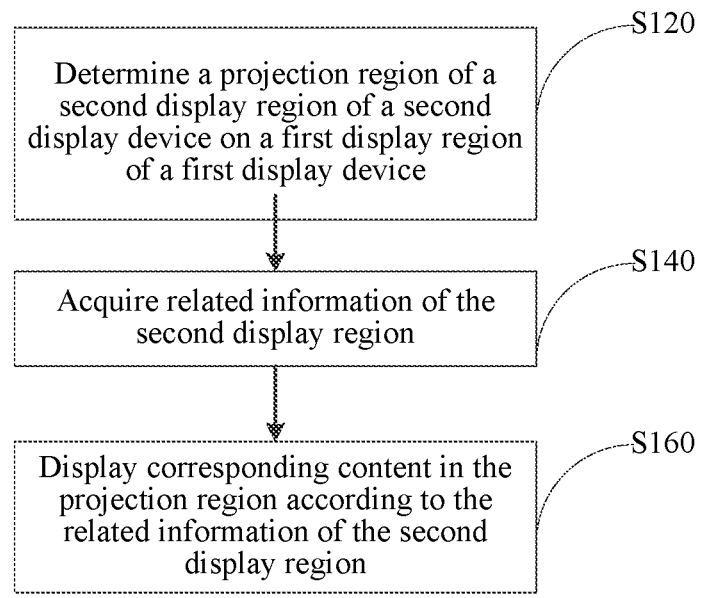
FIG. 1 is a flowchart of the content sharing method according to one example embodiment of the present application.

FIG. 1 is a flowchart of the content sharing method according to one embodiment of the present application. The method may be implemented on, for example, a content sharing apparatus. As shown in FIG. 1, the method comprises:

S120: determining a projection region of a second display region of a second display device on a first display region of a first display device;

S140: acquiring related information of the second display region; and

S160: displaying corresponding content in the projection region according to the related information of the second display region.

The content sharing method according to this embodiment of the present application determines a projection region of a second display region of a second display device on a first display region of a first display device, acquires related information of the second display region, and then displays corresponding content in the projection region according to the related information of the second display region, that is to say, a user can display content corresponding to the related information of the second display region at the projection region only by adjusting the position of the first display device or the second display device, thereby simplifying content sharing steps, improving content sharing efficiency and enhancing user experience.

The functions of steps S120, S140 and S160 will be described below in detail in combination with example embodiments.

S120: Determine a projection region of a second display region of a second display device on a first display region of a first display device.

The first display region of the first display device may be greater than the second display region of the second display device, for example, the first display device may be a transparent tablet computer, and the second display device may be a smart phone or the like.

Figure 2:
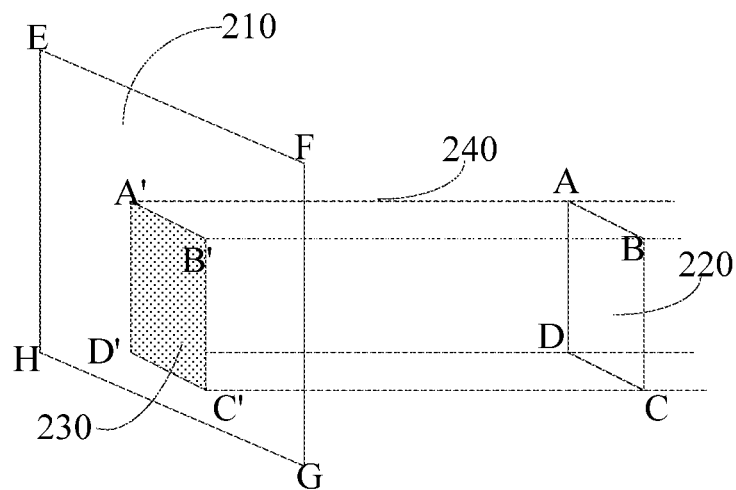
FIG. 2 is a schematic diagram of the orthographic projection region in one example embodiment of the present application.

Referring to FIG. 2, in one example embodiment, the projection region 230 is an orthographic projection region, that is, a projection line 240 is perpendicular to a projection plane (the plane where the first display region 210 is). Suppose that the first display region 210 and the second display region 220 are both rectangular, the projection region 230 of the second display region 220 on the first display region 210 is as shown in FIG. 2.

Figure 3:
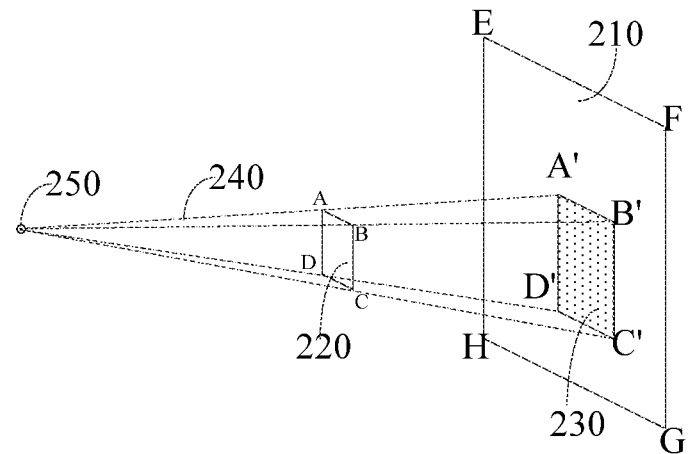
FIG. 3 is a schematic diagram of the central projection region in one example embodiment of the present application.

Referring to FIG. 3, in another example embodiment, the projection region 230 may be a central projection region, that is, a region formed by connecting points of intersection between a reference point 250 and a projection line 240 and a projection plane (the plane where the first display region 210 is) of the second display region 220. Suppose that the first display region 210 and the second display region 220 are both rectangular, the projection region 230 of the second display region 220 on the first display region 210 is as shown in FIG. 3. The reference point 250 can be preset, or determined according to a user input instruction.

Figure 4:
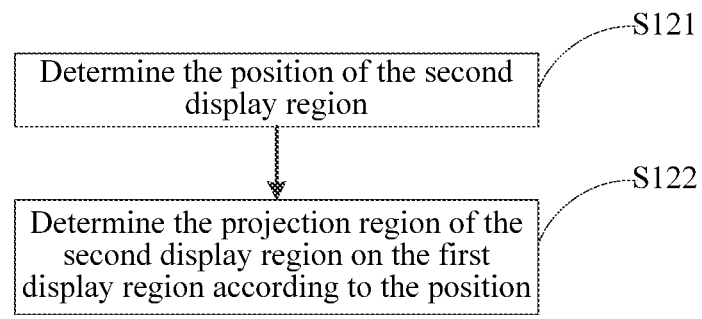
FIG. 4 is a flowchart of step S120 in one example embodiment of the present application.

Referring to FIG. 4, in one example embodiment, step S120 may comprise:

S121: determining the position of the second display region; and

S122: determining the projection region of the second display region on the first display region according to the position.

In step S121, the position of the second display region can be determined through communication with the second display device, for example, receiving visible light information or sound wave information sent by vertices A, B, C and D of the second display region 220.

In one example embodiment, the projection region can be determined based on the principle of orthographic projection in step S122. By still taking FIG. 2 as an example, suppose that positions of the four vertices A, B, C and D of the second display region 220 have been determined, according to the principle of orthographic projection, corresponding four projection points A', B', C' and D' of the vertices A, B, C and D on the first display region 210 can be obtained, and the projection region 230 can be obtained by connecting the four projection points A', B', C' and D'.

In another example embodiment, the projection region can be determined based on the principle of central projection in step S122. By still taking FIG. 3 as an example, suppose that positions of the four vertices A, B, C and D of the second display region 220 have been determined and the position of the reference point 250 has been pre-determined, according to the principle of central projection, corresponding four projection points A', B', C' and D' of the vertices A, B, C and D on the first display region 210 can be obtained, and the projection region 230 can be obtained by connecting the four projection points A', B', C' and D'.

Figure 5:
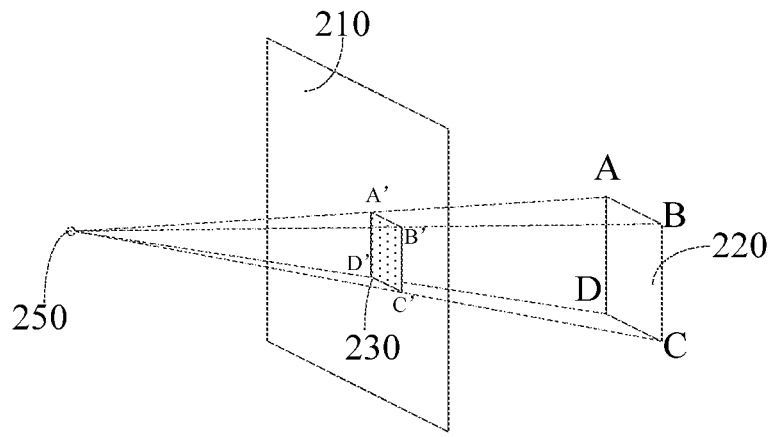
FIG. 5 is a schematic diagram of the central projection region in another example embodiment of the present application.

In addition, the position relation between the first display region 210 and the second display region 220 is not limited to the position relation shown in FIG. 3. In another example embodiment, as shown in FIG. 5, the first display region 210 may also be located between the second display region 220 and the reference point 250. In this case, the projection region 230 can be determined also according to the principle of central projection. Moreover, in this case, the reference point 250 may correspond to the position of eyes of the user, and the first display region 210 may be a virtual display region, for example, a display region projected by a pair of smart glasses in front of the eyes of the user, that is, a virtual display region relative to at least one eye of the user.

In the event that the reference point 250 corresponds to eyes of the user, the position of the eyes can be preset, or the position of the eyes can be acquired by photographing an image of the eyes and in combination with image processing.

S140: Acquire related information of the second display region.

In this step, the related information of the second display region can be acquired through communication with the second display device.

In one example embodiment, the related information of the second display region comprises: display content of the second display region. The display content may be an image, a map, a document, an application window or the like.

In another example embodiment, the related information of the second display region comprises: display content of the second display region, and associated information of the display content. For example, if the display content of the second display region is a local map of a certain city, the associated information may comprise views of different enlarged scales of the local map. Thus, after obtaining the related information of the projection region, the user can perform a zooming operation on the local map on the first display device.

In another example embodiment, the related information of the second display region comprises: coordinate information of display content of the second display region. For example, if a local map of a certain city is displayed in the second display region, the coordinate information is coordinate information (that is, latitude and longitude information) of two diagonal vertices (suppose that the second display region is rectangular) of the local map, and according to the coordinate information, the first display device can take a screenshot of the local map on a map stored locally and display the local map to the user in the projection region.

S160: Display corresponding content in the projection region according to the related information of the second display region.

The content displayed in the projection region corresponds to the related information of the second display region.

Figure 6:
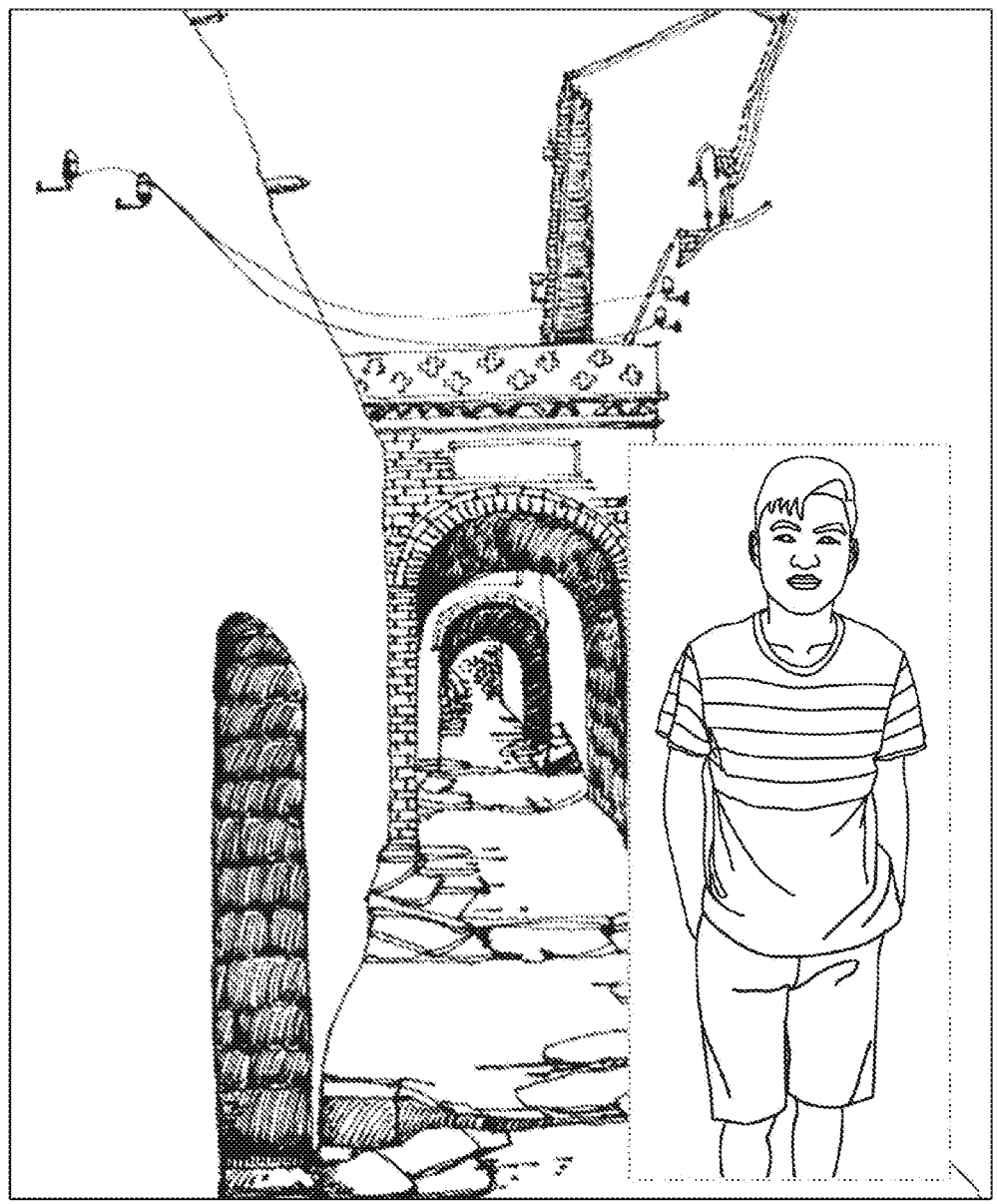
FIG. 6 is a schematic diagram of display effects of the first display region in one example embodiment of the present application.

In the event that the related information of the second display region is the display content of the second display region, the content displayed in the projection region is the display content of the second display region. For example, if the related information of the second display region is a character picture, in this step, the character picture will be displayed in the projection region. Suppose that a scenery picture is displayed in the first display region, in this step, the effect of image stitching shown in FIG. 6 will be achieved; the region encircled by a dotted box in FIG. 6 indicates the character picture, and the region encircled by a solid-line box indicates the scenery picture.

In the event that the related information of the second display region comprises display content of the second display region and associated information of the display content, the content displayed in the projection region is the display content of the second display region, and the associated information of the display content can be displayed according to a user instruction. For example, if the display content of the second display region is a city map and the associated information is views in different enlarged scales, in this step, the city map can be displayed in the projection region, and the city map can be zoomed within the range of the projection region according to the user instruction, that is, views in different scales are displayed.

In the event that the related information of the second display region is coordinate information of a map displayed in the second display region, in this step, the first display device can download the corresponding map according to the coordinate information, and displays the map corresponding to the coordinate information in the projection region.

Figure 7:
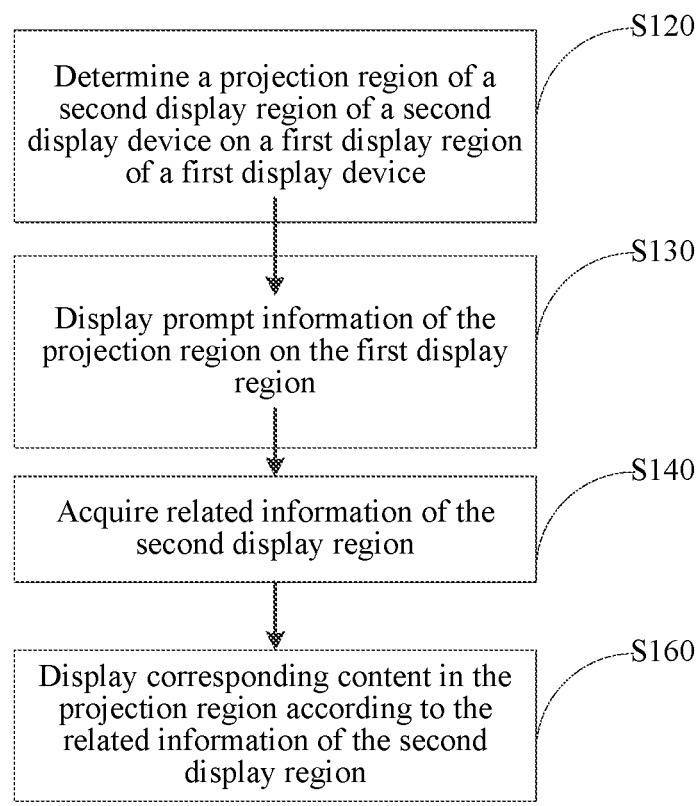
FIG. 7 is a flowchart of the content sharing method in another example embodiment of the present application.

In order to better guide the user to adjust the position of the first display device or the second display device to make the projection region located in a region desired by the user, referring to FIG. 7 in one example embodiment, the method may further comprise:

S130: displaying prompt information of the projection region on the first display region.

Figure 8:
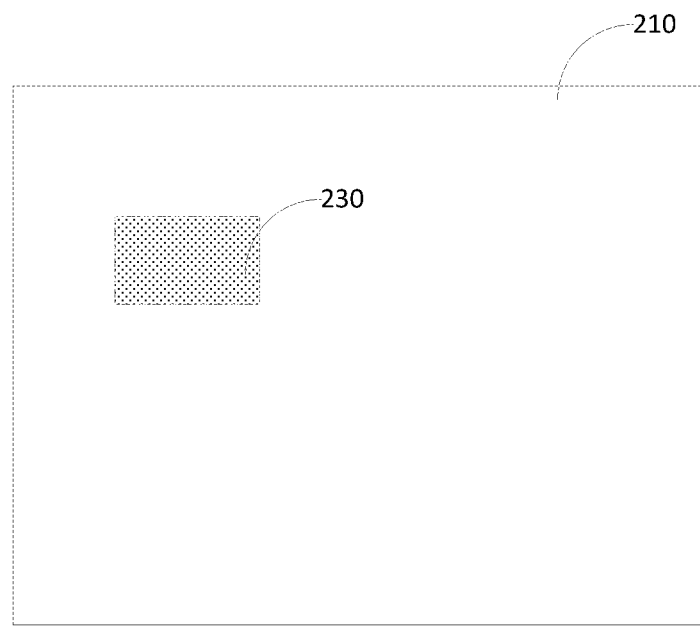
FIG. 8 is a schematic diagram of the prompt information in one example embodiment of the present application.

Referring to FIG. 8, the prompt information may be a dotted box displayed on the first display region 210, and a region encircled by the dotted box is the projection region 230. In response to that the user adjusts the position of the first display device or the second display device, that is, relative positions of the first display device and the second display device are adjusted, the dotted box will change its position on the first display region 210, and thus the user can adjust the position of the projection region on the first display region 210 more conveniently.

In addition, the embodiment of the present application further provides a computer readable medium, comprising a computer readable instruction that performs the following operations when being executed: executing the operations of step S120, S140 and S160 of the method in the example embodiment shown in FIG. 1.

To sum up, according to the method in the embodiment of the present application, a projection region of a second display region of a second display device on a first display region of a first display device can be determined, then corresponding content is displayed in the projection region according to related information of the second display region, and prompt information can be displayed to prompt a user to adjust relative positions of the first display device and the second display device, so as to help the user to adjust the position of the projection region on the first display region, thus simplifying an operation step of sharing a part of display content on the second display device to a predetermined display region of the first display device, improving content sharing efficiency and enhancing user experience.

Figure 9:
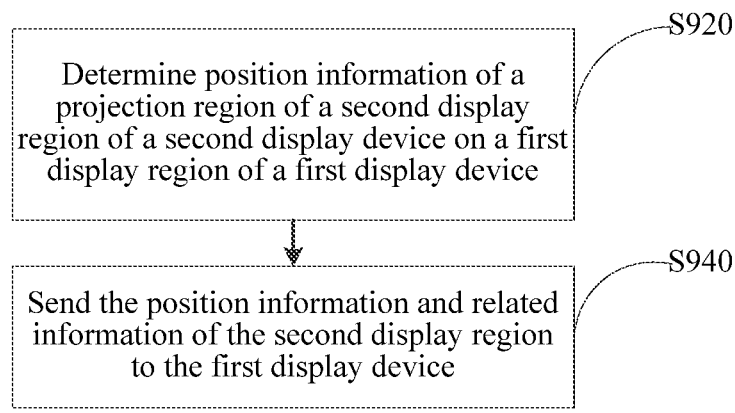
FIG. 9 is a flowchart of the content sharing method according to another example embodiment of the present application.

FIG. 9 is a flowchart of the content sharing method according to another embodiment of the present application; the method may be implemented, for example, on a content sharing apparatus; as shown in FIG. 9, the method may comprise:

S920: determining position information of a projection region of a second display region of a second display device on a first display region of a first display device; and S940: sending the position information and related information of the second display region to the first display device.

The content sharing method according to the embodiment of the present application determines position information of a projection region of a second display region of a second display device on a first display region of a first display device and sends the position information and related information of the second display region to the first display device, and then the first display device can display corresponding content in the projection region, thus simplifying content sharing steps, improving content sharing efficiency and enhancing user experience.

The functions of steps S920 and S940 will be described below in detail in combination with example embodiments.

S920: Determine position information of a projection region of a second display region of a second display device on a first display region of a first display device.

The first display region of the first display device may be greater than the second display region of the second display device, for example, the first display device may be a transparent tablet computer, and the second display device may be a smart phone or the like.

Referring to FIG. 2, in one example embodiment, the projection region 230 is an orthographic projection region, that is, a projection line 240 is perpendicular to a projection plane (the plane where the first display region 210 is). Suppose that the first display region 210 and the second display region 220 are both rectangular, the projection region 230 of the second display region 220 on the first display region 210 is as shown in FIG. 2.

Referring to FIG. 3, in another example embodiment, the projection region 230 may be a central projection region, that is, a region formed by connecting points of intersection between a reference point 250 and a projection line 240 and a projection plane (the plane where the first display region 210 is) of the second display region 220. Suppose that the first display region 210 and the second display region 220 are both rectangular, the projection region 230 of the second display region 220 on the first display region 210 is as shown in FIG. 3. The reference point 250 can be preset, or determined according to a user input instruction.

Figure 10:
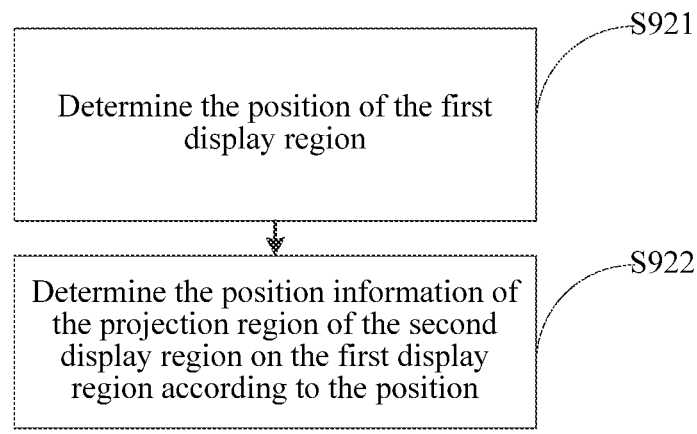
FIG. 10 is a flowchart of step S920 in one example embodiment of the present application.

Referring to FIG. 10, in one example embodiment, step S920 may comprise:

S921: determining the position of the first display region; and

S922: determining the position information of the projection region of the second display region on the first display region according to the position.

In step S921, the position of the first display region may be determined through communication with the first display device, for example, receiving visible light information or sound wave information sent by vertices E, F, G and H of the first display region 210.

In one example embodiment, the projection region may be determined based on the principle of orthographic projection in step S922. By still taking FIG. 2 as an example, suppose that the position of the first display region 210 has been determined, according to the principle of orthographic projection, corresponding four projection points A', B', C' and D' of the vertices A, B, C and D on the first display region 210 can be obtained, and the projection region 230 can be obtained by connecting the four projection points A', B', C' and D'.

In another example embodiment, the projection region can be determined based on the principle of central projection in step S122. By still taking FIG. 3 as an example, suppose that the position of the first display region 210 has been determined and the position of the reference point 250 has been pre-determined, according to the principle of central projection, corresponding four projection points A', B', C' and D' of the vertices A, B, C and D on the first display region 210 can be obtained, and the projection region 230 can be obtained by connecting the four projection points A', B', C' and D'.

In addition, the position relation between the first display region 210 and the second display region 220 is not limited to the position relation shown in FIG. 3. Referring to FIG. 5, the first display region 210 may also be located between the second display region 220 and the reference point 250. In this case, the projection region 230 can be determined also according to the principle of central projection. Moreover, in this case, the reference point 250 may correspond to the position of eyes of the user, and the first display region 210 may be a virtual display region, for example, a display region projected by a pair of smart glasses in front of the eyes of the user, that is, a virtual display region relative to at least one eye of the user.

In the event that the reference point 250 corresponds to eyes of the user, the position of the eyes can be preset, or the position of the eyes can be acquired by photographing an image of the eyes and in combination with image processing.

S940: Send the position information and related information of the second display region to the first display device.

The positioning information may be coordinate information configured to determine the projection region, for example, coordinate information of the projection points A', B', C' and D'.

In one example embodiment, the related information of the second display region comprises: display content of the second display region. The display content may be an image, a map, a document, an application window or the like.

In another example embodiment, the related information of the second display region comprises: display content of the second display region, and associated information of the display content. For example, if the display content of the second display region is a local map of a certain city, the associated information may comprise views of different enlarged scales of the local map. Thus, after obtaining the related information of the projection region, the user can perform a zooming operation on the local map on the first display device.

In another example embodiment, the related information of the second display region comprises: coordinate information of display content of the second display region. For example, if a local map of a certain city is displayed in the second display region, the coordinate information is coordinate information (that is, latitude and longitude information) of two diagonal vertices (suppose that the second display region is rectangular) of the local map, and according to the coordinate information, the first display device can take a screenshot of the local map on a map stored locally and display the local map to the user in the projection region.

In addition, the first display device can display corresponding content in the projection region according to the position information and the related information of the second display region. For example, suppose that the related information of the second display region is a character picture and a scenery picture is displayed in the first display region, the first display device will achieve the effect of image stitching shown in FIG. 6 in the first display region.

In addition, the embodiment of the present application further provides a computer readable medium, comprising a computer readable instruction that performs the following operations when being executed: executing the operations of step S920 and S940 of the method in the example embodiment shown in FIG. 9.

Figure 11:
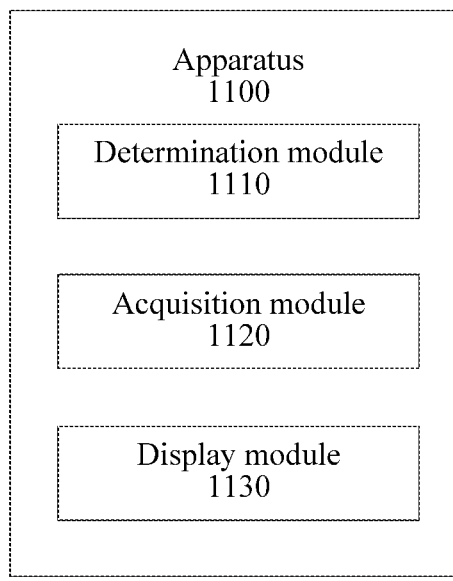
FIG. 11 is a schematic diagram of a modular structure of the content sharing apparatus according to one example embodiment of the present application.

FIG. 11 is a schematic diagram of a modular structure of the content sharing apparatus according to one embodiment of the present application; as shown in FIG. 11, the apparatus 1100 may comprise:

a determination module 1110, configured to determine a projection region of a second display region of a second display device on a first display region of a first display device;

an acquisition module 1120, configured to acquire related information of the second display region; and a display module 1130, configured to display corresponding content in the projection region according to the related information of the second display region.

The content sharing apparatus according to this embodiment of the present application determines a projection region of a second display region of a second display device on a first display region of a first display device, acquires related information of the second display region, and then displays corresponding content in the projection region according to the related information of the second display region, that is to say, a user can display content corresponding to the related information of the second display region at the projection region only by adjusting the position of the first display device or the second display device, thereby simplifying content sharing steps, improving content sharing efficiency and enhancing user experience.

The content sharing apparatus can be integrated to the first display device as a functional module.

The functions of the determination module 1110, the acquisition module 1120 and the display module 1130 will be described below in detail in combination with example embodiments.

A determination module 1110, configured to determine a projection region of a second display region of a second display device on a first display region of a first display device.

The first display region of the first display device may be greater than the second display region of the second display device, for example, the first display device may be a transparent tablet computer, and the second display device may be a smart phone or the like.

Figure 12:
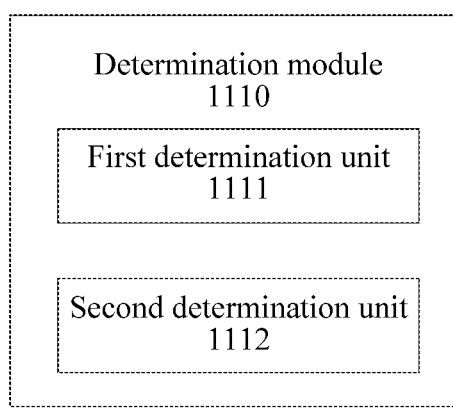
FIG. 12 is a schematic diagram of a modular structure of the determination module in one example embodiment of the present application.

Referring to FIG. 12, in one example embodiment, the determination module 1110 may comprise:

a first determination unit 1111, configured to determine the position of the second display region; and a second determination unit 1112, configured to determine the projection region of the second display region on the first display region according to the position.

The first determination unit 1111 can determine the position of the second display region through communication with the second display device, for example, receiving visible light information or sound wave information sent by vertices of the second display region.

In one example embodiment, the second determination unit 1112 may determine the projection region based on the principle of orthographic projection.

In another example embodiment, the second determination unit 1112 may determine the projection region based on the principle of central projection.

An acquisition module 1120, configured to acquire related information of the second display region.

The acquisition module 1120 may acquire the related information of the second display region through communication with the second display device.

In one example embodiment, the related information of the second display region comprises: display content of the second display region.

In another example embodiment, the related information of the second display region comprises: display content of the second display region, and associated information of the display content.

In another example embodiment, the related information of the second display region comprises: coordinate information of display content of the second display region.

A display module 1130, configured to display corresponding content in the projection region according to the related information of the second display region.

The content displayed in the projection region corresponds to the related information of the second display region.

In the event that the related information of the second display region is the display content of the second display region, the content displayed in the projection region is the display content of the second display region.

In the event that the related information of the second display region comprises display content of the second display region and associated information of the display content, the content displayed in the projection region is the display content of the second display region, and the associated information of the display content can be displayed according to a user instruction.

In the event that the related information of the second display region is coordinate information of a map displayed in the second display region, the display module can download the corresponding map according to the coordinate information, and displays the map corresponding to the coordinate information in the projection region.

Figure 13:
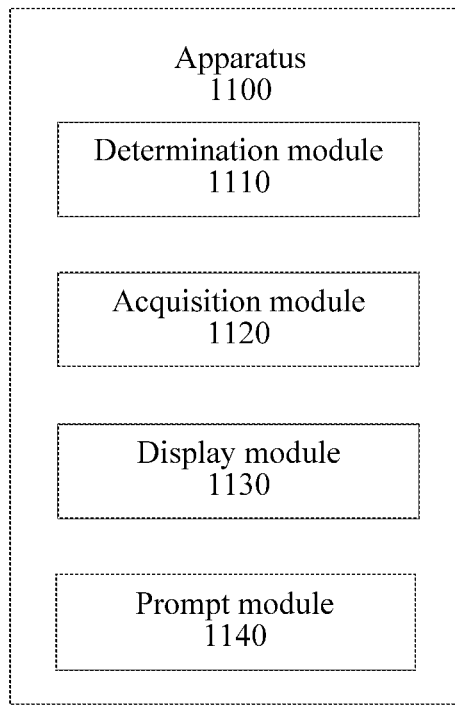
FIG. 13 is a schematic diagram of a modular structure of the content sharing apparatus in one example embodiment of the present application.

In order to better guide the user to adjust the position of the first display device or the second display device to make the projection region located in a region desired by the user, referring to FIG. 13, in one example embodiment, the apparatus 1110 may further comprise:

a prompt module 1140, configured to display prompt information of the projection region on the first display region.

Figure 14:
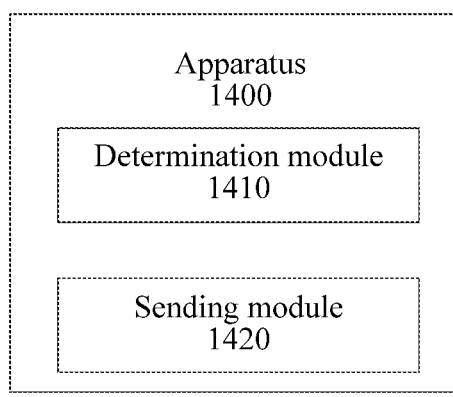
FIG. 14 is a schematic diagram of a modular structure of the content sharing apparatus according to another example embodiment of the present application.

FIG. 14 is a schematic diagram of a modular structure of the content sharing apparatus according to another embodiment of the present application; as shown in FIG. 14, the apparatus 1400 may comprise:

a determination module 1410, configured to determine position information of a projection region of a second display region of a second display device on a first display region of a first display device; and a sending module 1420, configured to send the position information and related information of the second display region to the first display device.

The content sharing apparatus according to this embodiment of the present application determines position information of a projection region of a second display region of a second display device on a first display region of a first display device and sends the position information and related information of the second display region to the first display device, and then the first display device can display corresponding content in the projection region, thus simplifying content sharing steps, improving content sharing efficiency and enhancing user experience.

The content sharing apparatus can be integrated to the second display device as a functional module.

The functions of the determination module 1410 and the sending module 1420 will be described below in detail in combination with example embodiments.

A determination module 1410, configured to determine position information of a projection region of a second display region of a second display device on a first display region of a first display device.

Figure 15:
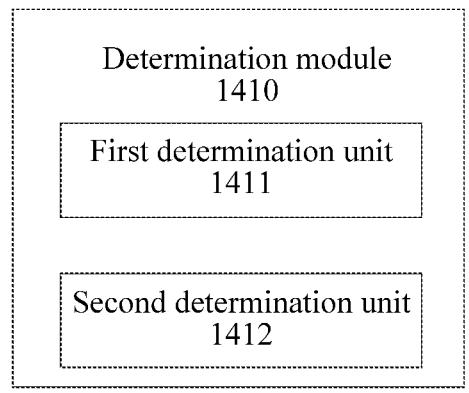
FIG. 15 is a schematic diagram of a modular structure of the determination module in one example embodiment of the present application.

Referring to FIG. 15, in one example embodiment, the determination module 1410 may comprise:

a first determination unit 1411, configured to determine the position of the first display region; and a second determination unit 1412, configured to determine the position information of the projection region of the second display region on the first display region according to the position.

The first determination unit 1411 may determine the position of the first display region through communication with the first display device, for example, receiving visible light information or sound wave information sent by vertices of the first display region.

In one example embodiment, the second determination unit 1412 may determine the projection region based on the principle of orthographic projection.

In another example embodiment, the second determination unit 1412 may determine the projection region based on the principle of central projection.

A sending module 1420, configured to send the position information and related information of the second display region to the first display device.

The position information may be coordinate information configured to determine the projection region, for example, coordinate information of the projection points.

In one example embodiment, the related information of the second display region comprises: display content of the second display region.

In another example embodiment, the related information of the second display region comprises: display content of the second display region, and associated information of the display content.

In another example embodiment, the related information of the second display region comprises: coordinate information of display content of the second display region.

In addition, the first display device can display corresponding content in the projection region according to the position information and the related information of the second display region. For example, suppose that the related information of the second display region is a character picture and a scenery picture is displayed in the first display region, the first display device will achieve the effect of image stitching shown in FIG. 6 in the first display region.

One application scenario of the content sharing methods and apparatuses of the present application may be as follows: scenery pictures are played on a LCD TV in a slide mode, a user wants to embed a character picture on a tablet computer into a particular region of the scenery pictures, then the user aligns the table computer with the particular region, adjusts the position of the tablet computer according to prompt information of a current projection region displayed on the TV until the position is ideal, and then says "OK" at the tablet computer, and then the character picture is transmitted to the LCD TV and displayed in the particular region.

Figure 16:
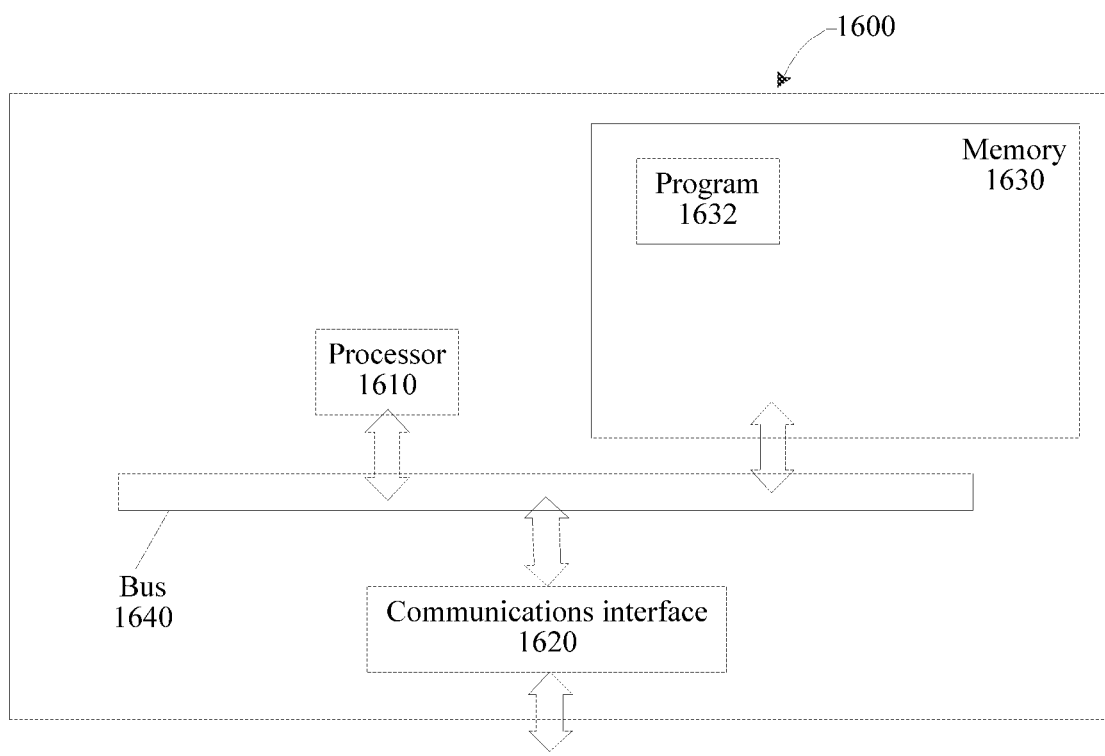
FIG. 16 is a schematic diagram of a hardware structure of the content sharing apparatus according to one example embodiment of the present application.

A hardware structure of the content sharing apparatus according to one embodiment of the present application is as shown in FIG. 16. The embodiment of the present application does not limit implementation of the content sharing apparatus; referring to FIG. 16, the apparatus 1600 may comprise:

a processor 1610, a Communications Interface 1620, a memory 1630, and a communications bus 1640.

The processor 1610, the Communications Interface 1620, and the memory 1630 accomplish mutual communications via the communications bus 1860.

The Communications Interface 1620 is configured to communicate with other network elements.

The processor 1610 is configured to execute a program 1632, and specifically, can implement relevant steps in the method embodiment shown in FIG. 1.

Specifically, the program 1632 may comprise a program code, the program code comprising a computer operation instruction.

The processor 1610 may be a Central Processing Unit (CPU), or an Application Specific Integrated Circuit (ASIC), or be configured to be one or more integrated circuits which implement the embodiments of the present application.

The memory 1630 is configured to store the program 1632. The memory 1630 may comprise a high-speed RAM memory, and may also comprise a non-volatile memory, for example, at least one magnetic disk memory. The program 1632 may specifically perform the following steps of:

determining a projection region of a second display region of a second display device on a first display region of a first display device;

acquiring related information of the second display region; and displaying corresponding content in the projection region according to the related information of the second display region.

Reference can be made to the corresponding description in the corresponding steps or modules in the embodiments for implementation of the steps in the program 1632, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 17:
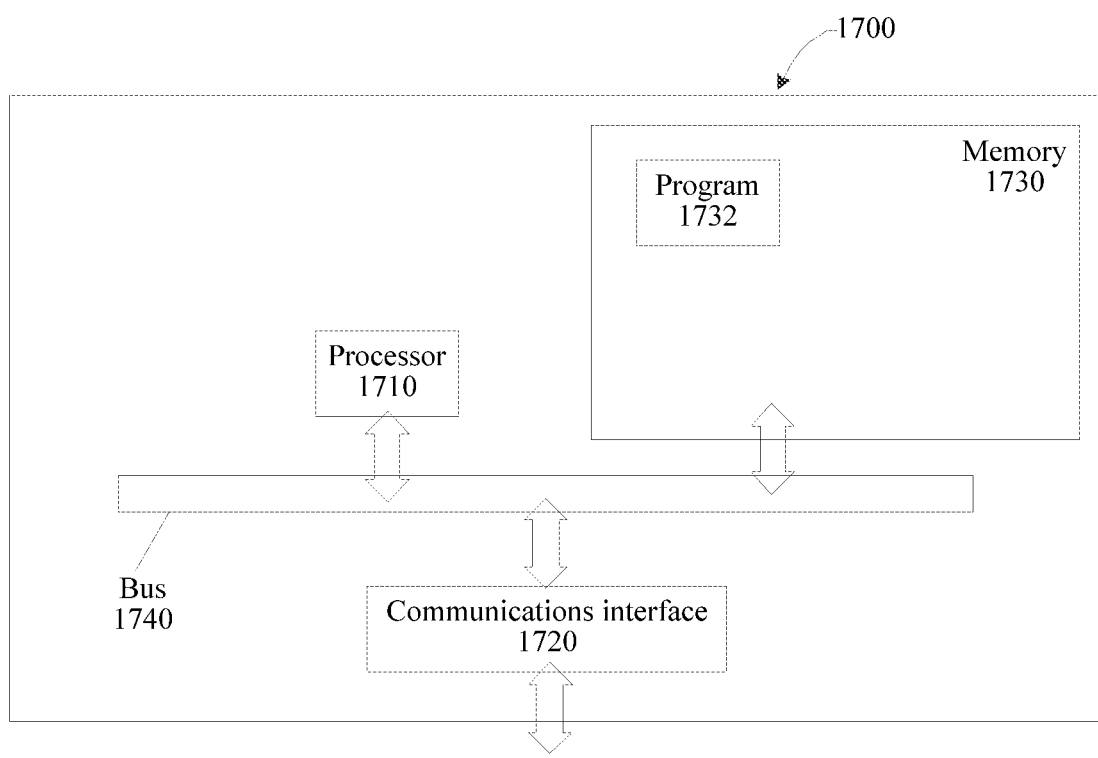
FIG. 17 is a schematic diagram of a hardware structure of the content sharing apparatus according to another example embodiment of the present application.

A hardware structure of the content sharing apparatus according to another embodiment of the present application is as shown in FIG. 17. The embodiment of the present application does not limit implementation of the content sharing apparatus; referring to FIG. 17, the apparatus 1700 may comprise:

a processor 1710, a Communications Interface 1720, a memory 1730, and a communications bus 1740.

The processor 1710, the Communications Interface 1720, and the memory 1730 accomplish mutual communications via the communications bus 1740.

The Communications Interface 1720 is configured to communicate with other network elements.

The processor 1710 is configured to execute a program 1732, and specifically, can implement relevant steps in the method embodiment shown in FIG. 1.

Specifically, the program 1732 may comprise a program code, the program code comprising a computer operation instruction.

The processor 1710 may be a Central Processing Unit (CPU), or an Application Specific Integrated Circuit (ASIC), or be configured to be one or more integrated circuits which implement the embodiments of the present application.

The memory 1730 is configured to store the program 1732. The memory 1730 may comprise a high-speed RAM memory, and may also comprise a non-volatile memory, for example, at least one magnetic disk memory. The program 1732 may specifically perform the following steps of:

determining position information of a projection region of a second display region of a second display device on a first display region of a first display device; and sending the position information and related information of the second display region to the first display device.

Reference can be made to the corresponding description in the corresponding steps or modules in the embodiments for implementation of the steps in the program 1732, which is not repeated herein. Those skilled in the art can clearly understand that, reference can be made to the corresponding process description in the method embodiments for the devices described above and the specific working procedures of the modules, and will not be repeated herein in order to make the description convenient and concise.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such example embodiment should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a controller, or a network device, and the like) to execute all or some steps of the method described in each embodiment of the present application. The foregoing storage medium comprises, a USB disk, a removable hard disk, a Read-Only Memory (ROM), a Random Access Memory (RAM), a magnetic disk, an optical disk or any other mediums that can store program codes.

The above example embodiments are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A method, applicable to a first display device, comprising:
    detecting a position of a second display device with respect to the first display device;
    displaying a dotted box on a first display region of the first display device to encircle a projection region to indicate the projection region in which content from the second display device is to be played;
    changing a position of the dotted box in response to adjustment of relative positions of the first display device and the second display device, so as to display prompt information of the projection region; and
    in response to a detected position allowing a display of the second display device to be projected to the first display device through a central projection with reference to at least one eye of a user, determining a projection region of a second display region of the second display device on a first display region of the first display device, wherein, in the central projection, the first display region is located between the second display region and the at least one eye of the user, and a first size of the first display region is greater than a second size of the second display region;
    acquiring related information of the second display region; and
    displaying corresponding content in the projection region according to the related information of the second display region,
    wherein the projection region is determined by a positional relationship between the first display device and the second display device, and wherein the projection region is used to display content shared by the second display device to the first display device, and
    wherein, the related information of the second display region comprises coordinate information of display content of the second display region and the content is map content, displaying corresponding content in the projection region comprises taking a screenshot of a local map on a map stored locally and display the local map to the user in the projection region.

2. The method of claim 1, wherein the determining the projection region comprises:
    determining a position of the second display region; and
    determining the projection region of the second display region on the first display region according to the position of the second display region.

3. The method of claim 1, further comprising:
    displaying prompt information of the projection region on the first display region.

4. The method of claim 1, wherein the first display region is a virtual display region.

5. The method of claim 4, wherein the first display region is a virtual display region relative to the at least one eye of the user.

6. The method of claim 1, wherein the related information of the second display region comprises:
    the display content of the second display region.

7. The method of claim 1, wherein the related information of the second display region comprises:
    the display content of the second display region, and associated information of the display content of the second display region.

8. A method, applicable to a second display device, comprising:
    detecting a position of the second display device with respect to a first display device;
    in response to a detected position allowing a display of the second display device to be projected to the first display device through a central projection with reference to an eye of a user, determining position information of a projection region of a second display region of the second display device on a first display region of the first display device, wherein the projection region is determined by a positional relationship between the first display device and the second display device and is encircled by a dotted box displayed by the first display region to indicate the projection region in which content from the second display device is to be played, the dotted box having a position changed in response to adjustment of relative positions of the first display device and the second display device, wherein, in the central projection, the first display region is located between the second display region and the eye of the user, and a first size of the first display region is greater than a second size of the second display region; and sending the position information and related information of the second display region to the first display device such that the first display device is able to display corresponding content in the projection region that is encircled by the dotted box, wherein, the related information of the second display region comprises coordinate information of display content of the second display region and the content is map content, such that the first device takes a screenshot of a local map on a map stored locally and display the local map to the user in the projection region.

9. The method of claim 8, wherein the determining the position information comprises:
determining a position of the first display region; and
determining the position information of the projection region of the second display region on the first display region according to the position of the first display region.

10. The method of claim 8, wherein the first display region is a virtual display region.

11. The method of claim 10, wherein the first display region is a virtual display region relative to the eye of the user.

12. The method of claim 8, wherein the related information of the second display region comprises:
the display content of the second display region.

13. The method of claim 8, wherein the related information of the second display region comprises:
the display content of the second display region, and associated information of the display content of the second display region.

14. An apparatus, applicable to a first display device, comprising:
a memory that stores executable modules; and
a processor, coupled to the memory, that executes or facilitates execution of the executable modules, comprising:
a determination module configured to determine, in response to a detected position of a second display device with respect to the first display device that allows a display of the second display device to be projected to the first display device through a central projection with reference to a user's eyes, a projection region of the second display region of the second display device on a first display region of the first display device, wherein, in the central projection, the first display region is located between the second display region and an eye of the user's eyes, and a first size of the first display region is greater than a second size of the second display region;
an acquisition module configured to acquire related information of the second display region, wherein the related information comprises coordinate information of display content of the second display region; and
a display module configured to display corresponding content in the projection region according to the related information of the second display region, display a dotted box on the first display region of the first display device to encircle the projection region to indicate the projection region in which content from the second display device is to be played and change a position of the dotted box in response to adjustment of relative positions of the first display device and the second display device, so as to display prompt information of the projection region, wherein the projection region is determined by a positional relationship between the first display device and the second display device, and wherein the projection region is used to display content shared by the second display device to the first display device, and wherein the corresponding content is downloaded according to the coordinate information, and wherein, the related information of the second display region comprises coordinate information of display content of the second display region and the content is map content, displaying corresponding content in the projection region comprises taking a screenshot of a local map on a map stored locally and display the local map to the user in the projection region.

15. The apparatus of claim 14, wherein the determination module comprises:
a first determination unit configured to determine a position of the second display region wherein the position of the second display region is determined through communication with the second display device; and
a second determination unit configured to determine the projection region of the second display region on the first display region according to the position of the second display region, wherein the projection region of the second display region is determined through at least one of orthographic projection or central projection.

16. An apparatus, applicable to a second display device, comprising:
a memory that stores executable modules; and
a processor, coupled to the memory, that executes or facilitates execution of the executable modules, comprising:
a determination module configured to determine, in response to a detected position of a second display device with respect to the first display device that allows a display of the second display device to be projected to the first display device through a central projection with reference to a user's eyes, position information of a projection region of the second display region of the second display device on a first display region of the first display device, wherein the projection region is determined by a positional relationship between the first display device and the second display device, wherein, in the central projection, the first display region is located between the second display region and the an eye of the user's eyes, and a first size of the first display region is greater than a second size of the second display region; and
a sending module configured to send the position information and related information of the second display region to the first display device such that the first display device displays corresponding content in the projection region that is encircled by a dotted box to indicate the projection region in which content from the second display device is to be played, wherein the position information comprises coordinate information of the projection points, wherein, the related information of the second display region comprises coordinate information of display content of the second display region and the content is map content, such that the first device takes a screenshot of a local map on a map stored locally and display the local map to the user in the projection region.

17. The apparatus of claim 16, wherein the determination module comprises:

a first determination unit configured to determine a position of the first display region wherein the position of the first display region is determined through communication with the first display device; and a second determination unit configured to determine the position information of the projection region of the second display region on the first display region according to the position of the first display region, wherein the projection region of the second display region is determined through at least one of orthographic projection or central projection.

18. A computer readable storage apparatus, comprising at least one executable instruction, which, in response to execution, causes an apparatus comprising a processor to perform operations, comprising:

detecting a position of a second display device with respect to a first display device;

displaying a dotted box on a first display region of the first display device to encircle the projection region to indicate the projection region in which content from the second display device is to be played;

changing a position of the dotted box in response to adjustment of relative positions of the first display device and the second display device, so as to display prompt information of the projection region;

in response to a detected position that allows a display of the second display device to be projected to the first display device through a central projection with reference to a user's eyes, determining a projection region of the second display region of the second display device on a first display region of a first display device, wherein, in the central projection, the first display region is located between the second display region and an eye of the user's eyes, and a first size of the first display region is greater than a second size of the second display region;

acquiring related information of the second display region; and displaying corresponding content in the projection region according to the related information of the second display region, wherein the projection region is determined by a positional relationship between the first display device and the second display device, and wherein the projection region is used to display content shared by the second display device to the first display device, and wherein, the related information of the second display region comprises coordinate information of display content of the second display region and the content is map content, displaying corresponding content in the projection region comprises taking a screenshot of a local map on a map stored locally and display the local map to the user in the projection region.

19. An apparatus, comprising a processor and a memory, the memory storing executable instructions, the processor being connected to the memory via a communication bus, and when the apparatus operates, the processor executes the executable instructions stored in the memory, so that the apparatus performs operations, comprising:

detecting a position of a second display device with respect to a first display device;

displaying a dotted box on a first display region of the first display device to encircle the projection region to indicate the projection region in which content from the second display device is to be played;

changing a position of the dotted box in response to adjustment of relative positions of the first display device and the second display device, so as to display prompt information of the projection region; and in response to a detected position that allows a display of the second display device to be projected to the first display device through a central projection with reference to a user's eyes, determining a projection region of a second display region of the second display device on the first display region of a first display device, wherein, in the central projection, the first display region is located between the second display region and an eye of the user's eyes, and a first size of the first display region is greater than a second size of the second display region;

acquiring related information of the second display region; and displaying corresponding content in the projection region according to the related information of the second display region, wherein the projection region is determined by a positional relationship between the first display device and the second display device, and wherein the projection region is used to display content shared by the second display device to the first display device, and wherein, the related information of the second display region comprises coordinate information of display content of the second display region and the content is map content, displaying corresponding content in the projection region comprises taking a screenshot of a local map on a map stored locally and display the local map to the user in the projection region.

20. A computer readable storage apparatus, comprising at least one executable instruction, which, in response to execution, causes an apparatus comprising a processor to perform operations, comprising:

detecting a position of a second display device with respect to a first display device;

in response to a detected position that allows a display of the second display device to be projected to the first display device through a central projection with reference to a user's eyes, determining position information of a projection region of a second display region of the second display device on a first display region of the first display device, wherein the projection region is determined by a positional relationship between the first display device and the second display device and is encircled by a dotted box displayed by the first display region to indicate the projection region in which content from the second display device is to be played, the dotted box having a position changed in response to adjustment of relative positions of the first display device and the second display device, wherein, in the central projection, the first display region is located between the second display region and an eye of the user's eyes, and a first size of the first display region is greater than a second size of the second display region; and sending the position information and related information of the second display region to the first display device, wherein as a result of the sending, the first display device is able to display corresponding content in the projection region that is encircled by the dotted box, wherein, the related information of the second display region comprises coordinate information of display content of the second display region and the content is map content, such that the first device takes a screenshot of a local map on a map stored locally and display the local map to the user in the projection region.

21. An apparatus, comprising a processor and a memory, the memory storing executable instructions, the processor being connected to the memory via a communication bus, and when the apparatus operates, the processor executes the executable instructions stored in the memory, so that the apparatus performs operations, comprising:

detecting a position of a second display device with respect to a first display device;

in response to a detected position that allows a display of the second display device to be projected to the first display device through a central projection with reference to a user's eyes, determining position information of a projection region of a second display region of the second display device on a first display region of the first display device, wherein the projection region is determined by a positional relationship between the first display device and the second display device and is encircled by a dotted box displayed by the first display region, the dotted box having a position changed in response to adjustment of relative positions of the first display device and the second display device, wherein, in the central projection, the first display region is located between the second display region and an eye of the user's eyes, and a first size of the first display region is greater than a second size of the second display region; and sending the position information and related information of the second display region to the first display device such that the first display device is able to display corresponding content in the projection region that is encircled by the dotted box, wherein, the related information of the second display region comprises coordinate information of display content of the second display region and the content is map content, such that the first device takes a screenshot of a local map on a map stored locally and display the local map to the user in the projection region.

22. The computer readable storage apparatus of claim 18, wherein the first display region is a virtual display region.

23. The apparatus of claim 19, wherein the first display region is a virtual display region.

24. The computer readable storage apparatus of claim 20, wherein the first display region is a virtual display region.

25. The apparatus of claim 21, wherein the first display region is a virtual display region.

26. The computer readable storage apparatus of claim 18, wherein the first display region is a virtual display region relative to the user's eye.

27. The apparatus of claim 19, wherein the first display region is a virtual display region relative to the user's eye.

28. The computer readable storage apparatus of claim 20, wherein the first display region is a virtual display region relative to the user's eye.

29. The apparatus of claim 21, wherein the first display region is a virtual display region relative to the user's eye.

\* \* \* \* \*